United States Patent [19]

Mahoney, Jr.

[11] 4,314,929
[45] Feb. 9, 1982

[54] MINERAL REINFORCED POLYAMIDES

[75] Inventor: John J. Mahoney, Jr., Wilmington, Del.

[73] Assignee: E. I. Du Pont de Nemours and Company, Wilmington, Del.

[21] Appl. No.: 233,486

[22] Filed: Feb. 11, 1981

[51] Int. Cl.³ .............................................. C08K 9/06
[52] U.S. Cl. .............................. 260/42.15; 260/37 N; 260/42.52
[58] Field of Search ........................... 260/42.15, 37 N

[56] References Cited

U.S. PATENT DOCUMENTS

| | | | |
|---|---|---|---|
| 3,843,591 | 10/1974 | Hedrick et al. | 260/37 N |
| 3,845,163 | 10/1974 | Murch | 260/857 |
| 3,988,287 | 10/1976 | Inokuchi et al. | 260/42.15 |
| 4,105,709 | 8/1978 | Iwami et al. | 260/37 N |
| 4,174,358 | 11/1979 | Epstein | 525/183 |

Primary Examiner—Lewis T. Jacobs

[57] ABSTRACT

A composition having reduced gate smear is obtained from a selected polyamide, calcined calcium silicate and a selected toughening agent.

8 Claims, No Drawings

MINERAL REINFORCED POLYAMIDES

FIELD OF THE INVENTION

This invention relates to mineral reinforced polyamides and more particularly to such polyamides that exhibit reduced gate smear.

BACKGROUND

It is well known that commercial moldings of complex shape made from mineral reinforced polyamides such as those discussed in U.S. Pat. No. 3,843,591 often have a variety of visual surface blemishes. These blemishes may occur in parts where appearance is important, for example, power tool housings, automotive exterior parts, handles and the like. In laboratory testing of mechanical properties of such mineral reinforced polyamides a single gated test bar is commonly used and the visual surface blemishes appear as a dull area around the mold gate. These blemishes are commonly referred to as "gate smear".

It is also well known that in commercial molding operations it is desirable to use minimum cycle times to achieve maximum product rates and to fill molds without premature freezing of the polymer. In conventional mineral reinforced polyamides, as cycle time is reduced, the tendency for "gate smear" blemishes is increased. It is also understood that the lower the mineral content of the resin, the less tendency there is to form such blemishes.

During the course of work to try to improve the toughness of mineral reinforced polyamides by using toughening agents such as those described in U.S. Pat. Nos. 4,174,358 and 3,848,163 and British Pat. No 998,439 it was found that certain selected toughening agents had an unexpected effect in dramatically reducing gate smear blemishes.

SUMMARY OF THE INVENTION

The molding compositions of this invention contain
(a) 50 to 80 weight % of polyhexamethylene adipamide (66 polyamide) or polycaprolactam (6 plyamide) or mixtures thereof, having a number average molecular weight in the range of 10 to 30,000 with 15 to 25,000 preferred;
(b) 20 to 40 weight % finely divided calcined aluminum silicate as mineral, which is coated with 0.5 to 2% of an aminofunctional gamma-silane and which has a particle size characterized by a $D_{50}$ in the range of 0.8 to 1.2 micrometers;
(c) 5 to 15 weight % of a copolymer which is comprised of units of an $\alpha$-olefin having the formula R—CH=CH$_2$, where R is a radical selected from the class consisting of hydrogen and alkyl radicals having from 1 to 8 carbon atoms, and units of one or more $\alpha,\beta$-ethylenically unsaturated monocarboxylic acids having from 3 to 8 carbon atoms, said copolymer having from 0% to 90% of the carboxylic acid groups ionized by neutralization with metal ions uniformly distributed throughout the copolymer, and where unneutralized carboxyl groups of the carboxylic acid units can be esterified with a $C_1$—$C_6$ alkyl alcohol, said copolymer being a direct copolymer of the $\alpha$-olefins and the unsaturated monocarboxylic acid in which the carboxylic acid groups are randomly distributed and in which (1) the $\alpha$-olefin content of the copolymer is at least 50 mol percent, based on the $\alpha$-olefin/unsaturated monocarboxylic acid copolymer, (2) the unsaturated monocarboxylic acid content of the copolymer is from 0.2 to 25 mol percent, based on the $\alpha$-olefin-acid copolymer, and (3) any other monomer component optionally copolymerized in said copolymer is monoethylenically unsaturated, and said metal ions having an ionized valence of from one to three inclusive and said metal ions being selected from the group consisting of uncomplexed and complexed metal ions.

DESCRIPTION

The compositions can be made by compounding mineral and polyamide and toughening polymer and polyamide separately, and then extruding together, or by extruding the mineral/polyamide and toughener/polyamide separately and blending the pellets prior to molding. Alternately, the mineral and polyamide may be compounded together and the toughener may be added to the mixture, followed by further blending. Preparation by direct melt blending of mineral, polyamide and toughener simultaneously gives poor results in terms of gate smear. Representative toughening polymers include copolymers or ionic copolymers wherein the copolymers comprise a polymer of an $\alpha$-olefin having the general formula RCH=CH$_2$ where R is a radical selected from the class consisting of hydrogen and alkyl radicals having from 1 to 8 carbon atoms, the olefin content of said polymer being at least 50 mol percent based on the polymer, and an $\alpha,\beta$-ethylenically unsaturated carboxylic acid having 1 carboxylic acid groups, the acid monomer content of said polymer being from 0.2 to 25 mol percent based on the polymer.

The $\alpha$-olefin polymers of the present invention are copolymers of $\oplus$-olefins with ethylenically unsaturated acids. As indicated, the $\alpha$-olefins employed in the copolymer are $\alpha$-olefins which have the general formula RCH=CH$_2$ where R is either a hydrogen or an alkyl group having preferably from 1 to 8 carbon atoms. Thus, suitable olefins include ethylene, propylene, butane-1, pentene-1, hexene-1, heptene-1, 3-methylbutene-1, 4-methylpentene-1, etc. Although polymers of olefins having a higher number of carbon atoms can be employed in the present invention, they are not materials which are readily obtained or available. The concentration of the $\alpha$-olefin is at least 50 mol percent in the copolymer.

The second component of the base copolymer comprises an $\alpha,\beta$-ethylenically unsaturated carboxylic acid group containing monomer having preferably from 3 to 8 carbon atoms. Examples of such monomers are acrylic acid, methacrylic acid, and ethacrylic acid. As indicated, the concentration of acidic monoer in the copolymer is from 0.2 mol percent to 25 mol percent, and, preferably, from 1 to 10 mol percent.

The copolymers may be prepard as described in U.S. Pat. No. 3,264,272.

The molecular weight of the copolymers is most suitably defined by melt index, a measure of viscosity, described in detail in ASTM-D-1238-57T. The melt index of copolymers employed in the formation of ionic copolymers which are useful as plastics is preferably in the range of 0.1 to 1000 g./10 min., and, more particularly, in the range of 1.0 to 100 g./10 min.

The copolymer need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this paragraph, can be employed in combination with the olefin and the carboxylic acid comonomer. The scope of base copolymers suitable for use in the present invention is illustrated by the following examples: Ethylene/acrylic acid copolymers, ethylene/methacrylic acid copolymers, ethylene/acrylic acid/methyl methacrylate copolymers, ethylene methacrylic acid/ethyl acrylate copolymers, ethylene/acrylic acid/butyl acrylate copolymers; ethylene/methacrylic acid/butyl acrylate copolymers, ethylene/methacrylic acid/vinyl acetate copolymers, ethylene/acrylic acid/vinyl alcohol compolymers, and ethylene/propylene/acrylic acid copolymers.

The copolymers which contain metallic ions are obtained by the reaction of the copolymer with an ionizable metal compound.

Metal ions which are suitable in forming the ionic copolymers of the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention.

The preferred uncomplexed metal ions which are suitable in forming the ionic copolymers of the present invention, therefore comprise for the α-olefin-monocarboxylic acid copolymers, mono-, di and trivalent ions of metals in Groups I, II, III, IV-A and VIII of the Periodic Table of Elements (see page 392, *Handbook of Chemistry and Physics*, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^-$, $Hg^-$ and $Cu^-$. Suitable divalent metal ions are $Be^{+2}$, $Mg^{-2}$, $Ca^{+2}$, $Sr^{-2}$, $Ba^{+2}$, $Cu^{+2}$, $Cd^{+2}$, $Hg^{+2}$, $Sn^{+2}$, $Pb^{-2}$, $Fe^{-2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

These tougheners may optionally be used with other tougheners.

Representative aminofunctional silanes include gamma-Aminopropyl-triethoxysilane, N-beta-(aminoethyl)-gamma-amino-propyl-trimethoxysilane, beta-(3,4-Epoxycyclohexyl)ethyl-trimethoxysilane, and gamma-glycidoxy-propyltrimethoxy silane. Gamma-Aminopropyl-triethoxy silane is preferred.

PREPARATION OF MOLDING RESINS AND TEST PROCEDURES

The molding compositions of this invention are prepared as follows: The compositions are compounded in separate steps, that is, the calcined aluminum silicate with the polyamide and the toughening polymer with another portion of polyamide and the two compounded components, after casting into strand, cooling and chopping, are dry blended and fed to a molding machine. Alternatively the two compounded components may be melt blended before being fed to the molding machine.

All compounding is carried out on a 28 mm Werner and Pfleiderer twin screw extruder. All moldings are carried out on a 6 oz. screw injection molding machine. Tensile bars 8" long, and $\frac{1}{8}$" thick and flex bars $\frac{1}{2}$"×5'-'×$\frac{1}{8}$" are molded at melt temperatures of about 290° to 310° C. The mold temperature is about 90° C., generally with fast injection and a 20/20 or 20/30 molding cycle. The tensile bars are gated at one end along the side and typically the tendency toward developing surface blemishes can be observed as an irregular whitish area forming in a semi-circle around the mold gate. The size of the circle is an indication of the tendency to form blemishes and is known as gate smear.

For convenience of measurement of gate smear, a series of 11 bars were arranged in order of increasing gate smear and numbered from 0 to 10. Gate smear on all other samples was determined by comparison with this standard scale. The area of visual imperfection were measured for all the bars on the standard scale and area of visual imperfection for the other samples were determined by correlation with the values for the standard scale.

Mechanical properties were determined in the dry-as-molded conditiion using standard test methods. The notched Izod was determined at each end of the flex bar by ASTM D-256/56, tensile strength by D-638-58T, elongation by D-638-58T, and flexural modulus by D-790-58T. On some occasions the tests were modified by using less than the normally required number of samples. Melt flow of the toughening polymer is measured by ASTM-D-1238 Condition E. Particle sizes were determined by the manufacturer. One method of measurement is by Sedigraph 5000 Particle Size Analyzer on water dispersions of the calcined aluminum silicate. Mol Wt. of polyamides were determined by correlation with solution viscosity data or analysis of end groups.

The component Y in the blends below is 66 polyamide containing 40 weight percent calcined aluminum silicate with a $D_{50}$ in the range of 1.0 to 1.2 microns. The calcined aluminum silicate had been treated with 1.0 to 1.5% of gamma-aminopropyltriethoxysilane. The polyamide comprised 75% 66 polyamide of inherent viscosity 1.25±0.10 and 25% unextracted polycaprolactam (10% of one polycaprolactam component is monomer) with inherent viscosity about 1.4±0.15 (both measured as 0.5 grams per 100 ml of m-cresol at 25° C.).

The component X used in the blends is defined as follows:

In Examples 1, 2, 3 and Controls A & B, component X was 70% of 66 polymide of inherent viscosity about 1.25±0.10 measured as 0.5 g. per 100 mll of m-cresol at 25° C., COOH:65-73 eq/$10^6$ g., NH$_2$:47-53 eq./$10^6$ g.) and 30% of an ethylene/isobutylacrylate/methacrylic acid terpolymer of weight ratio 78/12/10 that is 72% neutralized with Zn+ ions. The ethylene terpolymer is prepared as described in Rees U.S. Pat. No. 3,264,272 and has a melt flow (gms/10 min) of 35 before neutralization and about 1 after.

In Example 4, component X was 80% of the 66 polyamide described in Example 1 compounded with 20% of an ethylene/methacrylic acid copolymer of weight ratio 90/10 that is 72% neutralized with Zn++ ions. The ethylene copolymer is prepared as described in Rees U.S. Pat. No. 3,264,272, and has a melt flow (gms/10 min) of about 1 after neutralization.

In Conrols C & D, component X was 81% of the 66 polyamide used in Example 1 blended with 19% of an elastomeric ethylene/propylene/1,4,hexadiene/2,5-norbornadiene polymer having a weight ratio of 66-70/25-29/4.1/0.4. Fifty-three percent of the ethylene tetrapolymer was grafted with about 1.8 percent of adjacent carboxyl groups (from a dicarboxylic acid) by the grafting method of Ex. 13B Caywood U.S. Pat. No. 3,884,882 in which the dicarboxylic acid was fumaric acid.

In Controls E and Examples 5 and 6, component X was 60% of the 66 polyamide used in Example 1 compounded with 40% of the ethylene copolymer of Example 4.

Test Results

The results of various experiments are discussed on the attached Tables 1-4.

TABLE 1

| EXAMPLE | COMPOSITION Y | COMPOSITION X | TENSILE STRENGTH Mpsi | ELONGATION % | FLEXURAL MODULUS Mpsi | NOTCHED IZOD Ft-Lb/In | GATE SMEAR CM² |
|---|---|---|---|---|---|---|---|
| 1 | 75% | 25% | 10.1 | 33.7 | 509 | 1.68/1.82 | 0 |
| 2 | 80% | 20% | 10.6 | 25.3 | 565 | 1.55/1.60 | .32 |
| Control A | 85% | 15% | 11.0 | 21.8 | 607 | 1.36/1.39 | .69 |
| Control B | 90% | 10% | 11.7 | 20.5 | 652 | 1.42/1.31 | 1.92 |

Total polyamide content, calcined aluminum silicate and toughener content was as follows:

| Example | Polyamide | Calcined aluminum silicate | Toughener |
|---|---|---|---|
| 1 | 62.5 | 30% | 7.5% |
| 2 | 62.0 | 32% | 6.0% |
| A | 61.5 | 34% | 4.5% |
| B | 61.0 | 36% | 3.0% |

Table 1 shows that addition of 6% or more of a partially neutralized terpolymer of ethylene/isobutyl acrylate/methacrylic acid substantially reduces gate smear blemishes with improved toughness and elongation and tolerable reductions in tensile strength and flexural modulus.

TABLE 2
OTHER POLYOLEFINS DRY BLENDS

| EXAMPLE | COMPONENT Y | COMPONENT X | TENSILE STRENGTH Mpsi | ELONGATION % | FLEXURAL MODULUS Mpsi | NOTCHED IZOD Ft-Lb/In | GATE SMEAR CM² |
|---|---|---|---|---|---|---|---|
| 3 | 80 | 20 | 10.6 | 31.7 | 560 | 1.8/1.9 | 0 |
| 4 | 70 | 30 | 11.5 | 28.3 | 560 | 1.8/1.6 | 0 |
| Control C | 80 | 20 | 11.2 | 20.3 | 585 | 1.7/2.5 | 1.19 |
| Control D | 70 | 30 | 10.3 | 24.5 | 520 | 1.9/2.1 | .94 |

Table 2 shows a comparison between tougheners which have monocarboxylic acids which are partially neutralized with zinc and a toughener which contains a dicarboxylic acid. While the elastomeric ethylene polymer toughener containing the dicarboxylic acid component used in controls C and D is slightly more effective in toughening than the ethylene terpolymer of Example 4, gate smear is unacceptable.

Total polyamide, calcined aluminum silicate and toughener content was:

| Example | Polyamide | Calcined aluminum silicate | Toughener |
|---|---|---|---|
| 3 | 62.0 | 32% | 6% |
| 4 | 66.0 | 28% | 6% |
| Control C | 64.2 | 32% | 3.8% |
| Control D | 66.3 | 28% | 5.7% |

TABLE 3
MOLDING STUDY

| | RAM IN MOTION TIME (Seconds) | GATE SMEAR CM² |
|---|---|---|
| Example 3 | 0.75 | 1.92 |
| " | 1.0 | 1.92 |
| " | 1.3 | 1.05 |
| " | 1.5 | .32 |
| " | 1.5 | .47 |
| " | 2.0 | .32 |
| Component Y (polyamide + calcined aluminum silicate) | 1.5 | 1.92 |
| | 2.5 | .47 |

Table 3 shows that increasing speed of molding results in

TABLE 3-continued
MOLDING STUDY

| | RAM IN MOTION TIME (Seconds) | GATE SMEAR CM² |
|---|---|---| increased gate smear but addition of the appropriate toughener polymer enables the "ram in motion" time to be reduced from 2.5 sec. to 1.5 sec. for acceptable gate smear.

TABLE 4

| | % Y | % X | % 66 POLYAMIDE | GATE SMEAR CM² |
|---|---|---|---|---|
| Control E | 90 | 10 | — | 1.92 |
| Example 5 | 85 | 15 | — | 0.32 |
| Example 6 | 80 | 20 | — | 0.00 |
| Control F | 90 | — | 10 | 1.92 |
| Control G | 85 | — | 15 | 1.92 |
| Control H | 80 | — | 20 | 1.92 |

Table 4 shows that 6% toughener is sufficient to cause an acceptable reduction in gate smear (see Example 5) but without toughener more than 20% polyamide would be needed (see Control H), i.e., mineral content has to be diluted to less than 32%.

Total polyamide, calcined aluminum silicate and toughener content was:

| Example | Polyamide | Calcined aluminum silicate | Toughener |
|---|---|---|---|
| Control E | 60% | 36% | 4% |
| Example 5 | 60% | 34% | 6% |
| Example 6 | 60% | 32% | 8% |
| Control F | 64% | 36% | — |

TABLE 4-continued

| Control G | 66% | 34% | — |
| Control H | 68% | 32% | — |

I claim:
1. A polymeric composition consisting essentially of:
   A. 50 to 80 weight percent of a polyamide selected from polyhexamethylene adipamide or polycaprolactam or mixtures thereof, said polyamide having a number average molecular weight in the range of 10 to 30,000;
   B. 20 to 40 weight percent finely divided calcined aluminum silicate coated with 0.5 to 2% by weight of an aminofunctional silane, said silicate having a $D_{50}$ particle size in the range of 0.8 to 1.2 micrometers;
   C. 5 to 15 weight percent of a copolymer which is comprised of units of an α-olefin having the formula $R-CH=CH_2$, where R is a radical selected from the class consisting of hydrogen and alkyl radicals having from 1 to 8 carbon atoms, and units of one or more α,β-ethylenically unsaturated monocarboxylic acids having from 3 to 8 carbon atoms, said copolymer having from 0% to 90% of the carboxylic acid groups ionized by neutralization with metal ions uniformly distributed throughout the copolymer, and where unneutralized carboxyl groups of the carboxylic acid units can be esterified with a $C_1$-$C_6$ alkyl alcohol, said copolymer being a direct copolymer of the α-olefins and the unsaturated monocarboxylic acid in which the carboxylic acid groups are randomly distributed and in which (1) the α-olefin content of the copolymer is at least 50 mol percent, based on the α-olefin/unsaturated monocarboxylic acid copolymer, (2) the unsaturated monocarboxylic acid content of the copolymer is from 0.2 to 25 mol percent, based on the α-olefin-acid copolymer, and (3) any other monomer component optionally copolymerized in said copolymer is monoethylenically unsaturated, and said metal ions having an ionized valence of from one to three inclusive and said metal ions being selected from the group consisting of uncomplexed and complexed metal ions.

2. The polymeric composition of claim 1 wherein copolymer C is 5 to 15 weight percent of a copolymer comprising units derived from ethylene and units of one or more acrylic or methacrylic acid in which the carboxyl groups of the acid units are either esterified with a $C_1$-$C_6$ alkyl alcohol, partially neutralized with a cation of valence of 1-3, or unneutralized.

3. The composition of claim 1 or 2 wherein polyamide A is at least 50 weight % 66 polyamide and the remainder is 6 polyamide.

4. The composition of claim 3 wherein copolymer C is an ethylene/methacrylic acid copolymer.

5. The composition of claim 3 wherein copolymer C is an ethylene/isobutyl acrylate/methacrylic acid copolymer.

6. The composition of claim 3 wherein the acid component of the copolymer is 50 to 90% neutralized with divalent zinc.

7. Process for preparing the composition of claim 1 which comprises mixing polyamide defined as in claim 1 with copolymer C and mixing polyamide defined as in claim 1 with the calcined aluminum silicate, followed by combining the two mixtures.

8. Process for preparing molded articles with improved surface appearance which comprises extruding a composition defined in claim 1.

* * * * *